(12) United States Patent
Hamada et al.

(10) Patent No.: US 10,050,775 B2
(45) Date of Patent: Aug. 14, 2018

(54) ELEMENT REPLICATION DEVICE, ELEMENT REPLICATION METHOD, AND PROGRAM

(71) Applicant: NIPPON TELEGRAPH AND TELEPHONE CORPORATION, Chiyoda-ku (JP)

(72) Inventors: Koki Hamada, Musashino (JP); Dai Ikarashi, Musashino (JP); Koji Chida, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 76 days.

(21) Appl. No.: 15/109,584

(22) PCT Filed: Nov. 28, 2014

(86) PCT No.: PCT/JP2014/081546
§ 371 (c)(1),
(2) Date: Jul. 1, 2016

(87) PCT Pub. No.: WO2015/107780
PCT Pub. Date: Jul. 23, 2015

(65) Prior Publication Data
US 2016/0330016 A1 Nov. 10, 2016

(30) Foreign Application Priority Data
Jan. 17, 2014 (JP) ................. 2014-006618

(51) Int. Cl.
*H04L 9/32* (2006.01)
*H04L 9/00* (2006.01)

(52) U.S. Cl.
CPC ..................... *H04L 9/00* (2013.01)

(58) Field of Classification Search
CPC ....................................... H04L 9/00
(Continued)

(56) References Cited

U.S. PATENT DOCUMENTS

| | | | |
|---|---|---|---|
| 2010/0180337 A1* | 7/2010 | Bajekal ............... | G06F 21/6227 726/19 |
| 2013/0230168 A1* | 9/2013 | Takenouchi ........ | G06F 21/6209 380/46 |

OTHER PUBLICATIONS

Koji Chida, et al., "A Three-Party Secure Function Evaluation with Lightweight Verifiability Revisited," Computer Security Symposium Group Meeting, Mar. 2010, (6 pages) (with English abstract).

(Continued)

*Primary Examiner* — Anthony Brown
(74) *Attorney, Agent, or Firm* — Oblon, McClelland, Maier & Neustadt, L.L.P.

(57) ABSTRACT

A second set including a plurality of elements $a_5(1), \ldots, a_5(N)$ or a concealed text of the second set is obtained, where the second set is obtained by setting a replication source element $a(f(h))$ included in a first set to an element $a(f(h))-a(f(h-1))$ and setting elements other than the replication source in the first set to zero with respect to $h=2, \ldots, M$. An additive inverse of a replication source element $a(f(h-1))$ of which the order is before the replication source element $a(f(h))$ and is the closest to the replication source element $a(f(h))$ is $-a(f(h-1))$. The second set or the concealed text of the second set is used to obtain a third set or a concealed text of the third set. The third set is a set including a first element $b(1)=a_5(1)$ and $i=2, \ldots$, Nth element $b(i)=b(i-1)+a_5(i)$.

8 Claims, 4 Drawing Sheets

(58) Field of Classification Search
USPC ........................................................ 713/189
See application file for complete search history.

(56) References Cited

OTHER PUBLICATIONS

Koki Hamada, et al., "A Batch Mapping Algorithm for Secure Function Evaluation," the Transactions of The Institute of Electronics, Information and Communication Engineers. A, Engineering Sciences, vol. 96-A, No. 4, Apr. 2013, pp. 157-165, (with partial English translation).
Sven Laur, et al., "Round-Efficient Oblivious Database Manipulation," In Xuejia Lai, Jianyiung Zhou, and Hui Li, editors, ISC, vol. 7001 of LNCS, 2011, pp. 262-277.
Koki Hamada, et al., "A Linear Time Sorting Algorithm on Secure Function Evaluation," 2011 Symposium on Cryptography and Information Security, Jan. 25-28, 2011, pp. 1-7, with corresponding English version entitled: "Oblivious Radix Sort: An Efficient Sorting Algorithm for Practical Secure Multi-party Computation".
Koji Chida, et al., "Non-optimistic Secure Circuit Evaluation Based on ElGamal Encryption and Its Applications," IEICE Trans. Fundamentals, vol. E90-A, No. 1, Jan. 2007, pp. 128-138.
International Search Report dated Jan. 13, 2015 in PCT/JP2014/081546 filed Nov. 28, 2014.
Extended European Search Report dated Dec. 7, 2017 in corresponding European Patent Application No. 14878779.9, 9 pages.
Tomas Sander et al., "Non-Interactive CryptoComputing for $NC^1$", Foundations of Computer Science, 1999, IEEE, XP010366501,Oct. 17, 1999, pp. 554-566.

\* cited by examiner

ELEMENT REPLICATION DEVICE, ELEMENT REPLICATION METHOD, AND PROGRAM

TECHNICAL FIELD

The present invention relates to a technique of efficiently replicating an element included in a set.

BACKGROUND ART

Secure computation is a method to obtain a certain calculation result without restoring concealed values (see Non-patent Literature 1, for example). The method described in Non-patent Literature 1 performs concealing in which fragments of a value are distributed to three secure computation devices. The three secure computation devices perform calculations in cooperation, whereby the results of calculations such as addition and subtraction, constant addition, multiplication, constant multiplication, logical operation (NOT, logical AND, logical OR, exclusive OR), and data format conversion (integer, binary) can be maintained, without restoring a concealed value, in a state distributed to the three secure computation devices, that is, in a concealed state.

Non-patent Literature 2 recites a method of mapping these elements in accordance with a table by secure computation. In the method described in Non-patent Literature 2, a map in which an element (value) in a concealed table is replicated in the same sequence is realized in secure computation.

PRIOR ART LITERATURE

Non-Patent Literature

Non-patent Literature 1: Koji Chida, Koki Hamada, Dai Ikarashi, Katsumi Takahashi, "A Three-party Secure Function Evaluation with Lightweight Verifiability Revisited", In CSS, 2010

Non-patent Literature 2: Koki Hamada, Dai Ikarashi, Koji Chida, "A Batch Mapping Algorithm for Secure Function Evaluation", The transactions of the Institute of Electronics, Information and Communication Engineers. A, Engineering Sciences, Vol. 96, No. 4, pp. 157-165, April 2013

SUMMARY OF THE INVENTION

Problems to be Solved by the Invention

However, in a conventional technique, when the size of a column in which an element is replicated is N, O(N) times and O(log N) stages of multiplication has been necessary to replicate the element in the same column. This is true not only with a case where an element in a concealed table is replicated in the same column by secure computation but also with a case where an element in a set including ordered N elements is replicated as an element in the same set.

An object of the present invention is to reduce a calculation cost to replicate an element in a set including ordered elements.

Means to Solve the Problems

To solve the above-described problem, processes described below are performed. A second set including a plurality of elements $a_s(1), \ldots, a_s(N)$ or a concealed text of the second set is obtained, where the second set is obtained by setting a replication source element $a(f(h))$ included in a first set to an element $a(f(h))-a(f(h-1))$ and setting elements other than the replication source in the first set to zero with respect to $h=2, \ldots, M$. A third set or a concealed text of the third set is obtained using the second set or the concealed text of the second set, where the third set includes a first element $b(1)=a_s(1)$ and $i=2, \ldots,$ Nth element $b(i)=b(i-1)+a_s(i)$.

The first set includes a plurality of ordered elements $a(1), \ldots, a(N)$. A set of the elements $a(1), \ldots, a(N)$ includes a plurality of replication source elements $a(f(1)), \ldots, a(f(M))$. An additive inverse of a replication source element $a(f(h-1))$ is $-a(f(h-1))$, where the order of replication source element $a(f(h-1))$ is before the replication source element $a(f(h))$ and is the closest to the replication source element $a(f(h))$. The first element in the second set is $a_s(1)$, and $i=2, \ldots,$ Nth element in the second set is $a_s(i)$.

Effects of the Invention

According to the present invention, an element in a set can be replicated by addition, in which the calculation amount is small. This reduces calculation cost for replicating an element in a set including ordered elements.

DETAILED DESCRIPTION OF THE EMBODIMENTS

Embodiments of the present invention will be described below.

[Outline]

Firstly, the outline of each embodiment will be described.

In each embodiment, processes described below are performed. A second set including a plurality of elements $a_s(1), \ldots, a_s(N)$ or a concealed text of the second set is obtained, where the second set is obtained by setting a replication source element $a(f(h))$ included in a first set to an element $a(f(h))-a(f(h-1))$ and setting elements other than the replication source in the first set to zero with respect to $h=2, \ldots, M$. A third set or a concealed text of the third set is obtained using the second set or the concealed text of the second set. The third set includes a first element $b(1)=a_s(1)$ and $i=2, \ldots,$ Nth element $b(i)=b(i-1)+a_s(i)$.

The third set is a set in which the "replication source element" in the first set is replicated to all "elements other than the replication source" which are in the order after the "replication source element" and before the next replication source element in accordance with a certain order, and the "last replication source element" is replicated to all "elements other than the replication source" which are in the order after the "last replication source element." By calculating the second set or the concealed text of the second set, where the second set is obtained by setting the replication source element $a(f(h))$ included in the first set to the element $a(f(h))-a(f(h-1))$ and setting the elements other than the replication source to zero, the above-described third set or the concealed text of the third set can be calculated by cumulative addition. The calculation amount of addition is very small compared with multiplication such as product used in a conventional technique. This reduces calculation cost for replicating an element in a set including ordered elements, compared with a conventional technique.

The "first set" indicates a set including a plurality of ordered elements $a(1), \ldots, a(N)$, where N is an integer equal to or larger than 2, for example, an integer equal to or larger than 3. The first set may be an N-dimensional vector consisting of N elements $a(1), \ldots, a(N)$, a set of N elements $a(1), \ldots, a(N)$ included in a N+A-dimensional vector where A is an integer equal to or larger than 1, a set of N elements $a(1), \ldots, a(N)$ included in a matrix having N or more elements, or other set. Among the elements $a(1), \ldots, a(N)$, an order is defined (that is, a plurality of elements $a(1), \ldots, a(N)$ are ordered). This order may be predetermined or determined each time processing is performed. The ordering method is not limited, any ordering is acceptable as long as each element corresponds to a different order. For example, when the first set is an N-dimensional vector whose 1 st, ..., Nth elements are $a(1), \ldots, a(N)$ respectively, the element $a(n)$ may corresponds to nth order where $n \in \{1, \ldots, N\}$, or the element $a(n)$ may corresponds to N-n+1th order.

The set $\{a(1), \ldots, a(N)\}$ of the elements $a(1), \ldots, a(N)$ includes a plurality of replication source elements $a(f(1)), \ldots, a(f(M))$, where, $2 \leq M \leq N$, for example, M<N. The "replication source elements" indicate elements serving as the replication sources, that is, elements to be replicated. Each element $a(n)$ (where, $n \in \{1, \ldots, N\}$) is a replication source element $a(f(m))$ (where, $m \in \{1, \ldots, M\}$) or not a replication source element. In other words, each element $a(n)$ holds $\{a(f(1)), \ldots, a(f(M))\} \subseteq \{a(1), \ldots, a(N)\}$, for example, $\{a(f(1)), \ldots, a(f(M))\} \subset \{a(1), \ldots, a(N)\}$. The replication source elements $a(f(1)), \ldots, a(f(M))$ maintain the order relation in the elements $a(1), \ldots, a(N)$. That is, the orders in accordance with the orders of the elements $a(1), \ldots, a(N)$ correspond to the replication source elements $a(f(1)), \ldots, a(f(M))$. For example, when N=10 and M=4 hold, the orders of the elements $a(1), \ldots, a(10)$ are respectively 1st, ..., 10th, and the replication source elements are $a(1), a(4), a(5),$ and $a(9)$, the orders of the replication source elements $a(1), a(4), a(5),$ and $a(9)$ in a set $\{a(1), a(4), a(5), a(9)\}$ are respectively 1st, 2nd, 3rd, and 4th. Furthermore, an element of which the order is before the replication source element $a(f(h))$ (where, $h \in \{2, \ldots, M\}$) and is the closest to the replication source element $a(f(h))$ is expressed as $a(f(h-1))$. In other words, the replication source element of which the order in a set formed only of replication source elements is immediately before the replication source element $a(f(h))$ is expressed as $a(f(h-1))$.

For each element, at least addition (additive operation) is defined, and the addition is expressed as "+". Furthermore, for each element, at least an additive inverse is defined, and the additive inverse of an element $v$ is expressed as "$-v$". More specifically, the above $a(f(h))-a(f(h-1))$ represents the addition which adds the additive inverse $-a(f(h-1))$ to the element $a(f(h))$, and $b(i-1)+a_5(i)$ represents the addition which adds the element $a_5(i)$ to the element $b(i-1)$. Examples of the addition include summation, exclusive OR, remainder, $\theta$ mod P, of a result of summation $\theta$ by P where P is an integer equal to or larger than 2. For example, when the addition is summation, $a(f(h))-a(f(h-1))$ is a subtracted value obtained by subtracting $a(f(h-1))$ from $a(f(h))$, and $b(i-1)+a_5(i)$ is an addition value obtained by adding the element $a_5(i)$ to the element $b(i-1)$. Furthermore, an additive identity is expressed as "zero" or "0". An additive generator is expressed as "1".

A "concealed text of $\alpha$" in the present embodiment indicates information obtained by concealing $\alpha$ with a method enabling secure computation. Concealing methods include publicly known secret sharing and encryption. Examples of "concealing methods enabling secure computation" include publicly known linear secret sharing and homomorphic encryption. With these methods, a binary operation $\circ$ is defined between $\alpha_1$ and $\alpha_2$, for example, and when $\alpha_1 \circ \alpha_2 = \alpha_3$ is established, a concealed text $E(\alpha_1)$ of $\alpha_1$ and a concealed text $E(\alpha_2)$ of $\alpha_2$ can be used to calculate a concealed text $E(\alpha_3) = E((\alpha_1) \circ E(\alpha_2)$ of $\alpha_3$. In the same manner, when a unary operation $\circ$ is defined for $\alpha_1$ and $\circ \alpha_1 = a_3$ is established, for example, a concealed text $E(\alpha_1)$ of $\alpha_1$ can be used to calculate a concealed text $E(\alpha_3) = \circ E(\alpha_1)$ of $\alpha_3$. These calculations neither require restoration process for the concealed texts $E(\alpha_1)$ nor $E(\alpha_2)$. Concealing, restoring, addition, subtraction, multiplication, and logical operation on secure computation can be executed by well-known techniques described in Non-patent Literatures 1 and 2, for example. Random permutation on secure computation can be executed by well-known techniques described in Non-patent Literature 2 or Reference Literature 1 (Sven Laur, Jan Willemson, and Bingsheng Zhang, "Round-efficient oblivious database manipulation", In Xuejia Lai, Jianying Zhou, and Hui Li, editors, ISC, Vol. 7001 of LNCS, pp. 262-277, Springer, 2011), for example. A stable sort on secure computation can be executed by well-known techniques described in Non-patent Literature 2 or Reference Literature 2 (Koki Hamada, Dai Ikarashi, Koji Chida, Katsumi Takahashi, "A linear time sorting algorithm on secure function evaluation", In SCIS, pp. 1-7, 2011), for example. These processing can be executed by other techniques such as one described in Reference Literature 3 (Koji Chida, Noburou Taniguchi, Go Yamamoto, Masato Okazaki, Osamu Shionoiri, Atsushi Kanai, "Implementation and Application of Secure Circuit Evaluation Based on the ElGamal Encryption", CSS 2005, pp. 475-480, 2005), for example.

When a fourth set including the above element $a(f(h))-a(f(h-1))$ or a concealed text of the fourth set can be obtained in advance from a fifth set including the replication source elements $a(f(1)), \ldots, a(f(M))$ or a concealed text of the fifth set, a first arithmetic unit may use this fourth set or the concealed text of the fourth set to obtain the second set or the concealed text of the second set (pre-calculation method). For example, when the fourth set or the concealed text of the fourth set can be obtained in advance, the first arithmetic unit may use this fourth set or the concealed text of the fourth set to obtain the second set or the concealed text of the second set, where the fourth set obtained by setting the replication source element $a(f(h))$ to $a(f(h))-a(f(h-1))$, the replication source element $a(f(h))$ included in a sixth set including the replication source elements $a(f(1)), \ldots, a(f(M))$ ordered in accordance with the orders of the elements a(1), . . . , a(N). This further reduces the calculation cost. This method is suitable for a case where the first set or the concealed text of the first set can be obtained from the fifth set or the concealed text of the fifth set or the sixth set or the concealed text of the sixth set (hereinafter, "the fifth set and others"), that is, a case where "the fifth set and others" can be obtained before the first set or the concealed text of the first set (such as the method described in Non-patent Literature 2), for example.

Alternatively, the first arithmetic unit may use the first set or the concealed text of the first set to obtain the second set or the concealed text of the second set (post-calculation method). For example, the first arithmetic unit may use the first set or the concealed text of the first set to obtain a seventh set or a concealed text of the seventh set, where the seventh set is obtained by performing a stable sort of the elements a(1), . . . , a(N) included in the first set under a sorting criteria that is whether or not the element is a replication source, and the seventh set includes elements a(1), . . . , a(N) in which the orders of the elements a(f(1)), . . . , a(f(M)) are successive. The first arithmetic unit may further use the seventh set or the concealed text of the seventh set to obtain an eighth set or a concealed text of the eighth set, where eighth set is obtained by setting, with respect to h=2, . . . , M, a replication source element a(f(h)) included in the seventh set is set to a(f(h))–a(f(h−1)). The first arithmetic unit may then use the eighth set or the concealed text of the eighth set to obtain the second set or the concealed text of the second set, where the second set is obtained by sorting the elements in the eighth set and setting the elements other than the replication source to zero.

In this case, for example, the first arithmetic unit may use the concealed text of the first set to obtain the concealed text of the seventh set by secure computation. The first arithmetic unit may further obtain a concealed text of a ninth set, where the ninth set includes elements obtained by sorting elements p(a(1)), . . . , p(a(N)) representing the orders of the elements a(1), . . . , a(N) in accordance with the stable sort of the elements a(1), . . . , a(N). The first arithmetic unit may further use the concealed text of the seventh set to obtain the concealed text of the eighth set by secure computation. The first arithmetic unit may further use the concealed text of the eighth set and the concealed text of the ninth set to obtain, by secure computation, a concealed text of a tenth set and a concealed text of an eleventh set respectively, where the concealed text of the tenth set corresponding to the tenth set obtained by random permutation of the orders of the elements in the eighth set, the concealed text of the eleventh set corresponding to the eleventh set obtained by random permutation of the orders of the elements in the ninth set, while maintaining the correspondence relation between the elements in the eighth set and the elements in the ninth set. The tenth set is a set in which the orders of elements in the eighth set have been rearranged, and the eleventh set is a set in which the orders of elements in the ninth set have been rearranged. The first arithmetic unit may then use a restoring result of the concealed text of the eleventh set and the concealed text of the tenth set to obtain the concealed text of the second set which is a set obtained by sorting the elements in the tenth set and setting the elements other than the replication sources to zero.

Although the content of each element in the concealed text of the eighth set is concealed, the orders of the concealed texts of a(f(h))–a(f(h−1)) corresponding to the replication source elements are successive. Thus, if the ninth set is restored from the concealed text thereof and the elements representing the orders of the concealed texts of a(f(h))–a(f(h−1)) corresponding to the replication source elements are restored, information representing which element in the first set has been the replication source element is leaked to some extent. On the other hand, such information is not leaked if the elements representing the orders are obtained after random permutation on secure computation as described above.

When the "concealed text of the second set" and the "concealed text of the third set" are obtained in each embodiment, the first arithmetic unit obtains the concealed text of the second set by secure computation, and a second arithmetic unit uses the concealed text of the second set to obtain the concealed text of the third set by secure computation.

Each embodiment will be described below in detail with reference to the drawings.

In each embodiment, a concealed text of information a is denoted as [α]. For example, [α] having been concealed through secret sharing is a fragment (share) on the secret sharing and the concealed [α] through encryption is a cryptogram. The sth element of a vector β is denoted as β(s), and the entire vector obtained by concealing each element β(s) of the vector β is denoted as [β] and referred to as a concealed text [β] of the vector β.

An example will be described in each embodiment where the first set is an N-dimensional vector whose 1st, . . . , Nth elements are respectively the elements a(1), . . . , a(N), the second set is an N-dimensional vector $a_5$ whose 1st, . . . , Nth element are respectively the elements $a_5(1)$, . . . , $a_5(N)$, and the third set is an N-dimensional vector b whose 1st, . . . , Nth elements are respectively elements b(1), . . . , b(N). The elements of these N-dimensional vectors are ordered as the 1st, . . . , Nth elements, respectively. The vectors a, $a_5$, and b where N=10 and M=4 will be exemplified below.

$$a = \begin{pmatrix} w \\ * \\ * \\ x \\ y \\ * \\ * \\ * \\ z \\ * \end{pmatrix}, a_5 = \begin{pmatrix} w \\ 0 \\ 0 \\ x-w \\ y-x \\ 0 \\ 0 \\ 0 \\ z-y \\ 0 \end{pmatrix}, b = \begin{pmatrix} w \\ w \\ w \\ x \\ y \\ y \\ y \\ y \\ z \\ z \end{pmatrix} \quad (1)$$

where, w, x, y, and z which are respectively the 1st, 4th, 5th, and 9th element of the vector a are the replication source elements, and elements * other than these are the elements that are not the replication sources. "*" represents an arbitrary element. Although 2≤M<N in this example, the processing in the present embodiment can be performed even when 2≤M≤N.

First Embodiment

In the present embodiment, a specific example of the above-mentioned pre-calculation method will be described.

<Configuration>

Figure 1:
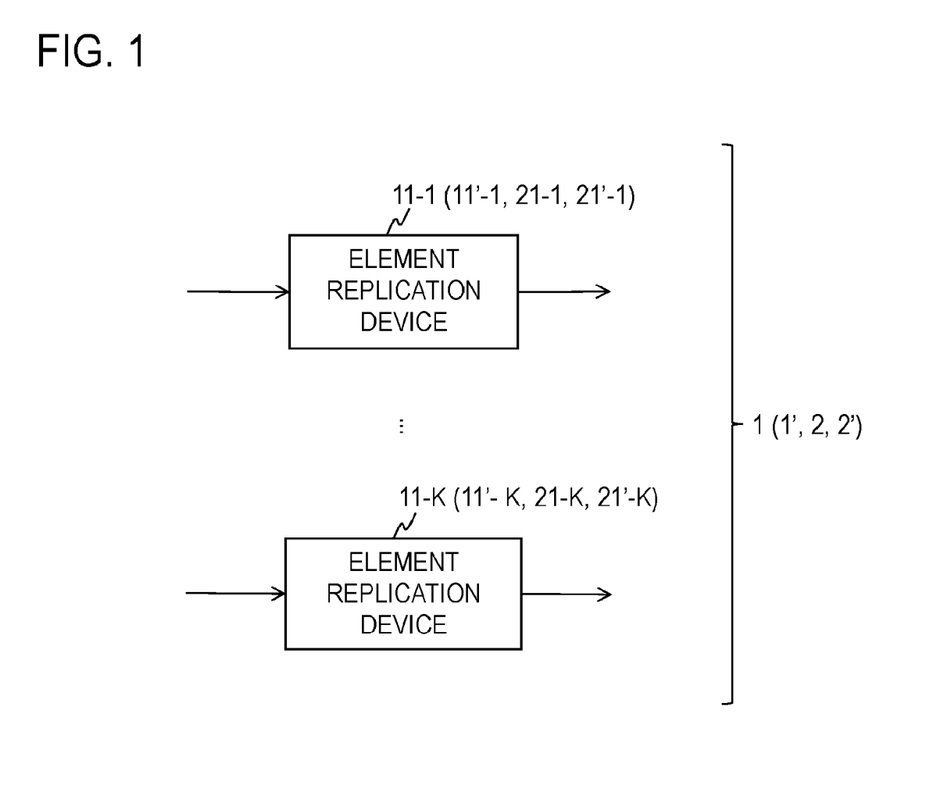
FIG. 1 is a block diagram illustrating the configuration of a secure computation system according to an embodiment.
Figure 2A:
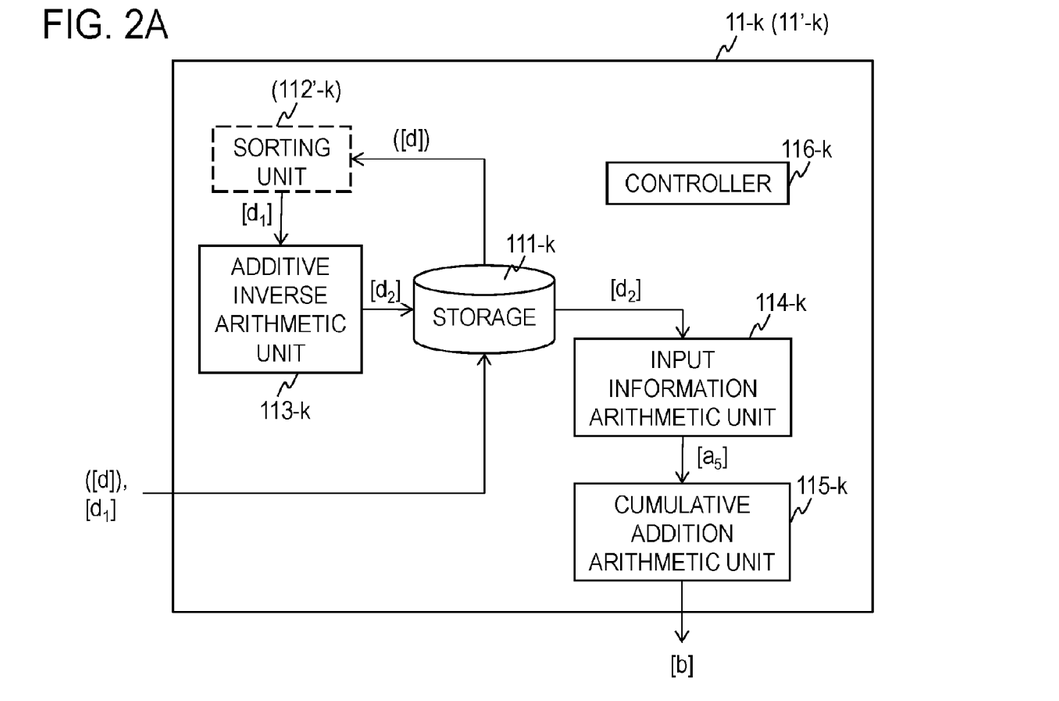
FIG. 2A is a block diagram illustrating the configuration of an element replication device according to a first embodiment and a modification thereof.
Figure 2B:
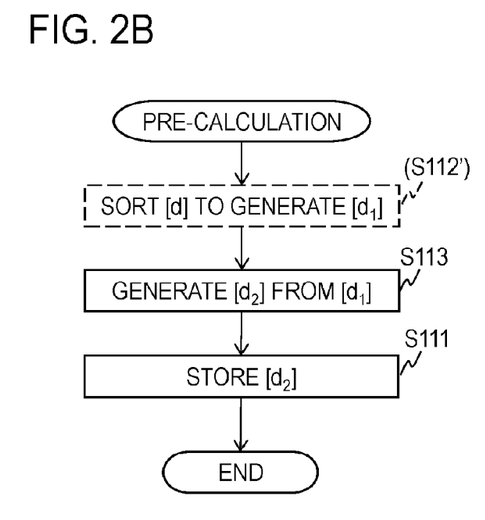
FIG. 2B is a flowchart illustrating processing of pre-calculation according to the first embodiment and the modification thereof.

As illustrated in FIG. 1, a secure computation system 1 according to the present embodiment includes one or more element replication devices 11-1 to 11-K. When concealing is performed through secret sharing, K is an integer equal to or larger than 2. When concealment calculation is performed through encryption, K is an integer equal to or larger than 1. As illustrated in FIG. 2A, the element replication device 11-$k$ (where, $k \in \{1, \ldots, K\}$) according to the present embodiment includes a storage 111-$k$, an additive inverse arithmetic unit 113-$k$, an input information arithmetic unit 114-$k$ (the first arithmetic unit), a cumulative addition arithmetic unit 115-$k$ (the second arithmetic unit), and a controller 116-$k$. As illustrated in FIG. 2B, the input information arithmetic unit 114-$k$ according to the present embodiment includes a replication source arrangement unit 1141-$k$, a replication source information generating unit 1142-$k$, and a multiplication arithmetic unit 1143-$k$. The element replication device 11-$k$ is a device formed with a predetermined program read into a general purpose or dedicated computer that includes a processor (hardware processor) such as a central processing unit (CPU) and a memory such as a random-access memory (RAM) or a read-only memory (ROM), for example. The element replication device 11-$k$ performs processing under the control of the controller 116-$k$. This computer may include a processor and a memory, or may include a plurality of processors and memories. This program may be installed in the computer, or may be recorded in advance in a ROM or the like. Part or all of the processing units may be formed by using an electronic circuitry having processing functions without using program, not by using an electronic circuitry, such as a CPU, implementing function configuration with a program read thereinto. Furthermore, an electronic circuitry forming one device may include a plurality of CPUs.

<Pre-Calculation>

In the present embodiment, the vector a (the first set) is not input to the element replication device 11-$k$, but a concealed text $[d_1]$ of a vector $d_1$ formed only of the replication source elements $a(f(1)), \ldots, a(f(M))$ (the concealed text of the fifth set or the concealed text of the sixth set) is input to the element replication device 11-$k$, and stored in the storage 111-$k$. The respective elements $a(f(1)), \ldots, a(f(M))$ of the vector $d_1$ are ordered accordance with the orders of the elements $a(1), \ldots, a(N)$ of the vector a. In the example according to the present embodiment, the $j$th element $d_1(j)$ of the vector $d_1$ is $d_1(j)=a(f(j))$, where $j \in \{1, \ldots, M\}$. The size N of the vector a and the orders of the elements $a(1), \ldots, a(N)$ are predetermined (in the present embodiment, $a(1), \ldots, a(N)$ are the 1st, ..., Nth elements of the N-dimensional vector).

As illustrated in FIG. 2B, the additive inverse arithmetic unit 113-$k$ (FIG. 2A) extracts the concealed text of $[d_1]$ of the vector $d_1$ from the storage 111-$k$, and obtains a concealed text $[d_2]$ of a vector $d_2$ (the fourth set) by secure computation, where the vector $d_2$ is obtained by setting the replication source element $a(f(h))$ included in the vector $d_1$ to $a(f(h))-a(f(h-1))$ (where, $h \in \{2, \ldots, M\}$) and the replication source elements $a(f(1))$ being maintained as is. That is, an element $d_2(h)$ of the vector $d_2$ (where, $h \in \{2, \ldots, M\}$) is an element $d_2(h)=d_1(h)-d_1(h-1)$, and an element $d_2(1)$ of the vector $d_2$ is $d_2(1)=d_1(1)$ (Step S113). The additive inverse arithmetic unit 113-$k$ outputs the concealed text $[d_2]$ of the vector $d_2$, and the concealed text $[d_2]$ of the vector $d_2$ is stored in the storage 111-$k$ (Step S111). In the case of the vector a exemplified in the expression (1), the relation among the vectors a, $d_1$, and $d_2$ is as below.

$$a = \begin{pmatrix} w \\ * \\ * \\ x \\ y \\ * \\ * \\ * \\ z \\ * \end{pmatrix}, d_1 = \begin{pmatrix} w \\ x \\ y \\ z \end{pmatrix}, d_2 = \begin{pmatrix} w \\ x-w \\ y-x \\ z-y \end{pmatrix}$$

<Element Replication>

Figure 2C:
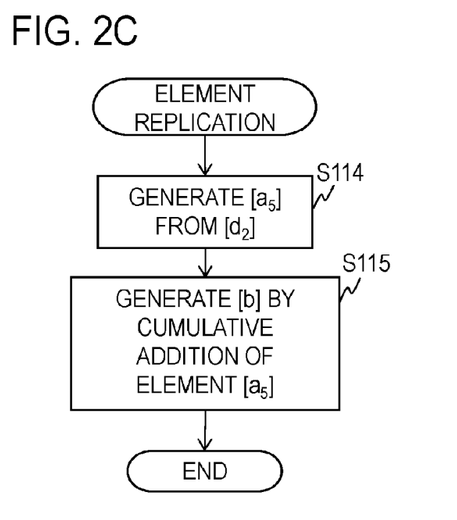
FIG. 2C is a flowchart illustrating processing of element replication according to the first embodiment and the modification thereof.

Processing of element replication according to the present embodiment will be described with reference to FIG. 2C. The input information arithmetic unit 114-$k$ extracts the concealed text $[d_2]$ of the vector $d_2$ (the fourth set) from the storage 111-$k$. The input information arithmetic unit 114-$k$ uses the concealed text $[d_2]$ of the vector $d_2$, and obtains a concealed text $[a_5]$ of the vector $a_5$ (the second set) by secure computation, where the vector $a_5$ is an N-dimensional vector whose 1st, ..., Nth elements are the elements $a_5(1), \ldots, a_5(N)$ respectively. The vector $a_5$ is obtained by setting the replication source element $a(f(h))$ of the vector a to an element $a(f(h))-a(f(h-1))$ and setting the elements other than the replication source to zero, with respect to $h=2, \ldots, M$. In the example according to the present embodiment, the orders of the elements $a(1), \ldots, a(N)$ of the vector a are predetermined, and the orders of the replication source elements $a(f(h))$ (positions in the vector a) are also predetermined. In accordance with these, the input information arithmetic unit 114-$k$ obtains the concealed text $[a_5]$ of the vector $a_5$, and outputs the obtained concealed text $[a_5]$, where the vector $a_5$ is an N-dimensional vector obtained by allocating each of the elements $a(f(h))-a(f(h-1))$ to each of the positions of the replication source elements $a(f(h))$ of the vector a and allocating zero to the other positions of the vector a (Step S114).

The cumulative addition arithmetic unit 115-$k$ uses the concealed text $[a_5]$ of the vector $a_5$ (the second set) to obtain, by secure computation, a concealed text $[b]$ of the vector b (the third set) which is an N-dimensional vector whose 1st element is $b(1)=a_5(1)$ and $i=2, \ldots,$ Nth element is $b(i)=b(i-1)+a_5(i)$, and outputs the obtained concealed text $[b]$(Step S115). The cumulative addition arithmetic unit 115-$k$, for example, firstly performs secure computation to obtain a concealed text $[b(1)]$ of $b(1)=a_5(1)$ and then performs secure computation to obtain a concealed text $[b(i)]$ of $b(i)=b(i-1)+a_5(i)$ with respect to each of $i=2, \ldots, N$ while increasing i by 1 from $i=2$, to obtain the concealed text $[b]$ of the vector b.

For example, for the vector a exemplified in the expression (1), the relation between the vectors $a_5$ and b described above is as below.

$$a_5 = \begin{pmatrix} w \\ 0 \\ 0 \\ x-w \\ y-x \\ 0 \\ 0 \\ 0 \\ z-y \\ 0 \end{pmatrix}, b = \begin{pmatrix} w \\ w \\ w \\ x \\ y \\ y \\ y \\ y \\ z \\ z \end{pmatrix}$$

First Modification of the First Embodiment

In the example described in the first embodiment, the concealed text $[d_1]$ of the vector $d_1$ in which the orders are set in accordance with the orders of the elements $a(1), \ldots, a(N)$ of the vector a is input to the element replication device 11-$k$ and stored in the storage 111-$k$. In the present modification, processing will be described in a case where a concealed text [d] of a vector d in which only the replication source elements $a(f(1)), \ldots, a(f(M))$ are included but the orders are not set in accordance with the orders of the elements $a(1), \ldots, a(N)$ of the vector a is input to the element replication device 11-$k$ and stored in the storage 111-$k$.

An element replication device 111'-$k$ of a secure computation system 1' according to the present modification consists of the element replication device 11-$k$ in the first embodiment and a sorting unit 112'-$k$ added thereto (FIGS. 1 and 2A). The sorting unit 112'-$k$ extracts the concealed text [d] of the vector d from the storage 111-$k$, sorts the concealed text [d] of the vector d by secure computation to obtain the concealed text $[d_1]$ of the vector $d_1$ in which the orders are set in accordance with the orders of the elements $a(1), \ldots, a(N)$ of the vector a, and outputs the obtained concealed text $[d_1]$ (FIG. 2B/Step S112'). The concealed text $[d_1]$ of the vector $d_1$ is input to the additive inverse arithmetic unit 113-$k$. Other matters are the same as those described in the first embodiment. For example, for the vector a exemplified in the expression (1), the relation among the vectors a, d, $d_1$, and $d_2$ is as below.

$$a = \begin{pmatrix} w \\ * \\ * \\ x \\ y \\ * \\ * \\ * \\ z \\ * \end{pmatrix}, d = \begin{pmatrix} x \\ z \\ y \\ w \end{pmatrix}, d_1 = \begin{pmatrix} w \\ x \\ y \\ z \end{pmatrix}, d_2 = \begin{pmatrix} w \\ x-w \\ y-x \\ z-y \end{pmatrix}$$

Second Modification of the First Embodiment

In the first embodiment and the first modification of the first embodiment, secure computation is applied to a concealed text of a vector serving as a processing object. However, with respect to a vector that may be disclosed, a plaintext vector may be a processing object instead of a concealed text of a vector, and calculation may be performed with respect to the plaintext vector, instead of secure computation. For example, in a case where a vector d may be disclosed, the sorting unit 112'-$k$ sorts the vector d to obtain the vector $d_1$. For example, when the vector $d_1$ may be disclosed, the additive inverse arithmetic unit 113-$k$ uses the vector $d_2$ to calculate the vector $d_1$, and the input information arithmetic unit 114-$k$ may use the vector $d_2$ as is. The additive inverse arithmetic unit 113-$k$ uses the vector $d_2$ to calculate the vector as, and the cumulative addition arithmetic unit 115-$k$ may use the vector $a_5$ to calculate the vector b, for example. In another case, a vector as a calculation result may be concealed and output.

Second Embodiment

In the present embodiment, a specific example of the above-mentioned post-calculation method will be described.
<Configuration>

Figure 3A:
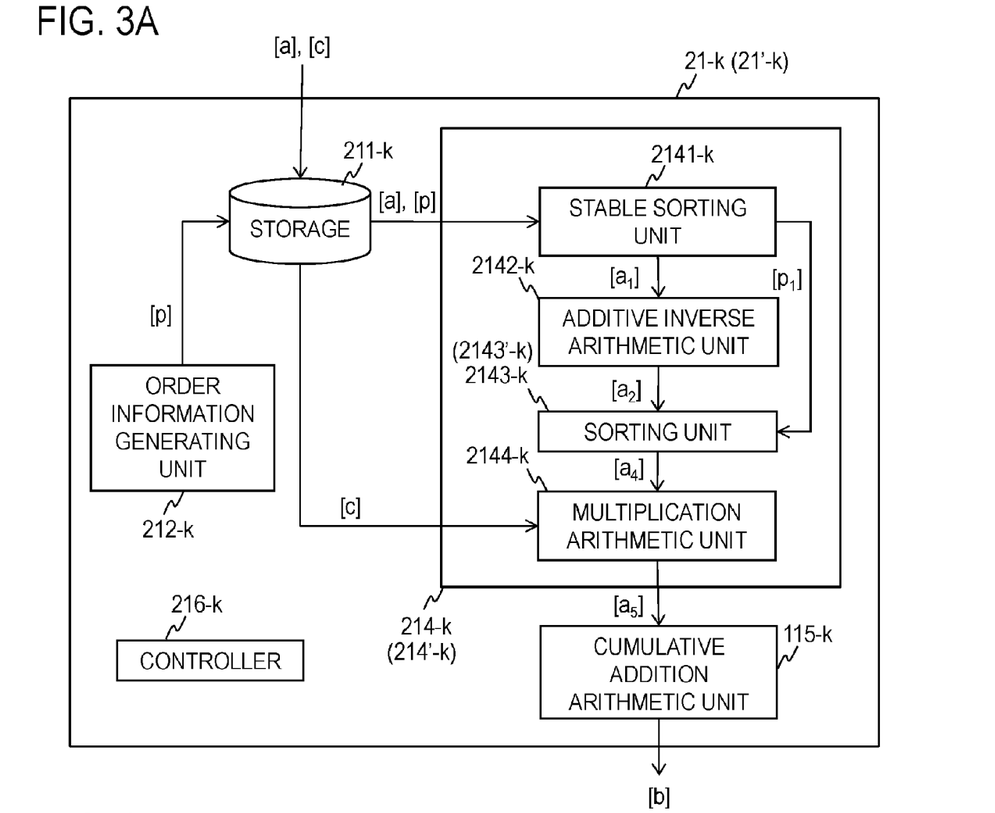
FIG. 3A is a block diagram illustrating the configuration of an element replication device according to a second embodiment and a modification thereof.
Figure 3B:
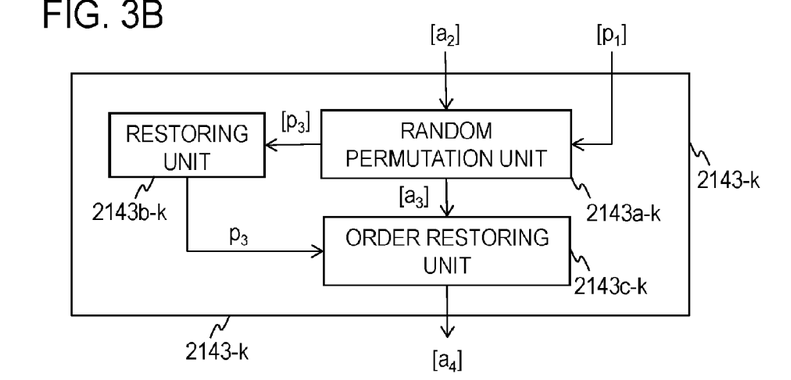
FIG. 3B is a block diagram illustrating the configuration of a sorting unit according to the second embodiment.

As illustrated in FIG. 1, a secure computation system 2 according to the present embodiment includes one or more element replication devices 12-1 to 12-K. As illustrated in FIG. 3A, an element replication device 21-$k$ (where, $k \in \{1, \ldots, K\}$) according to the present embodiment includes a storage 211-$k$, an order information generating unit 212-$k$, an input information arithmetic unit 214-$k$ (the first arithmetic unit), the cumulative addition arithmetic unit 115-$k$ (the second arithmetic unit), and the controller 116-$k$. The input information arithmetic unit 214-$k$ includes a stable sorting unit 2141-$k$, an additive inverse arithmetic unit 2142-$k$, a sorting unit 2143-$k$, and a multiplication arithmetic unit 2144-$k$. As illustrated in FIG. 3B, the sorting unit 2143-$k$ includes a random permutation unit 2143$a$-$k$, a restoring unit 2143$b$-$k$, and an order restoring unit 2143$c$-$k$. The cumulative addition arithmetic unit 115-$k$ is the same as that described in the first embodiment. The element replication device 21-$k$ is a device formed with a predetermined program read into a general purpose or dedicated computer, for example, and performs processing under the control of the controller 216-$k$.

<Element Replication>

Figure 4A:
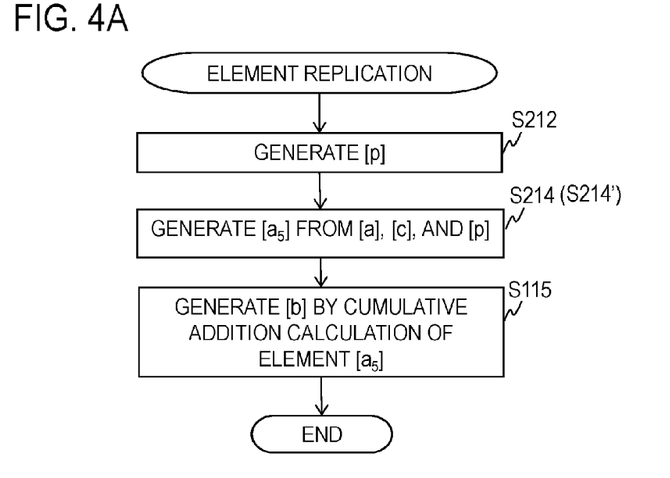
FIG. 4A is a flowchart illustrating processing of element replication according to the second embodiment and the modification thereof.

Processing of element replication according to the present embodiment will be described with reference to FIG. 4A.

It is assumed that a concealed text [α] of the vector a (the first set) and a concealed text [c] of a vector c indicating whether or not elements $a(1), \ldots, a(N)$ of the vector a are the replication source elements are input to the element replication device 21-$k$ and stored in the storage 211-$k$. The nth element of the vector c is $\varphi(a(n))$. When $a(n)$ is a replication source element, $\varphi(a(n))=1$, and when $\varphi(a(n))$ is not a replication source element, $\varphi(a(n))=0$. For example, for the vector a exemplified in the expression (1), the relation between the vectors a and c is as below.

$$a = \begin{pmatrix} w \\ * \\ * \\ x \\ y \\ * \\ * \\ * \\ z \\ * \end{pmatrix}, c = \begin{pmatrix} 1 \\ 0 \\ 0 \\ 1 \\ 1 \\ 0 \\ 0 \\ 0 \\ 1 \\ 0 \end{pmatrix}$$

Firstly, the order information generating unit 212-$k$ (FIG. 3A) generates a concealed text [p] of the vector p serving as a mark of the order (position) of each element a(n) (where, $n \in \{1, \ldots, N\}$) of the vector a, and outputs the generated concealed text [p] (Step S212). The vector p may be a N-dimensional vector consisting of N elements p(a(n)) (where, $n \in \{1, \ldots, N\}$) (for example, predefined elements) each of which is different from one another. For example, p(a(n))=n−1 (where, $n \in \{1, \ldots, N\}$). The concealed text [p] of the vector p is stored in the storage 211-$k$. For example, for the vector a exemplified in the expression (1) and p(a(n))=n−1, the relation among the vectors a, c, and p is as below.

$$a = \begin{pmatrix} w \\ * \\ * \\ x \\ y \\ * \\ * \\ * \\ z \\ * \end{pmatrix}, c = \begin{pmatrix} 1 \\ 0 \\ 0 \\ 1 \\ 1 \\ 0 \\ 0 \\ 0 \\ 1 \\ 0 \end{pmatrix}, p = \begin{pmatrix} 0 \\ 1 \\ 2 \\ 3 \\ 4 \\ 5 \\ 6 \\ 7 \\ 8 \\ 9 \end{pmatrix}$$

The input information arithmetic unit 214-$k$ extracts, from the storage 211-$k$, the concealed text [α] of the vector a (the first set), the concealed text [p] of the vector p, and the concealed text [c] of the vector c, obtains the concealed text [$a_5$] of the vector $a_5$ (the second set) by secure computation, and outputs the obtained concealed text [$a_5$] (Step S214).

<<Details of Step S214>>

Figure 4B:
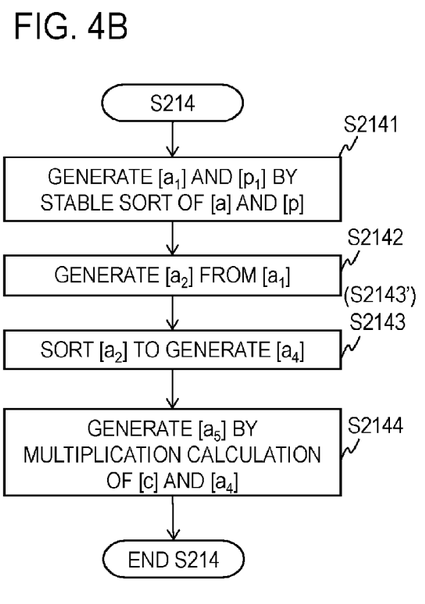
FIG. 4B is a flowchart illustrating processing of Steps S214 and S214' in FIG. 4A.

The details of Step S214 will be described with reference to FIG. 4B.

In the present embodiment, firstly, the stable sorting unit 2141-$k$ extracts the concealed text [α] of the vector a and the concealed text [p] of the vector p from the storage 211-$k$. The stable sorting unit 2141-$k$ uses the extracted concealed text [α] of the vector a and concealed text [p] of the vector p to obtain a concealed text [$a_1$] of the vector $a_1$ (the seventh set) and a concealed text [$p_1$] of the vector $p_1$ (the ninth set) by secure computation, and outputs the obtained concealed texts [$a_1$] and [$p_1$]. The vector $a_1$ is obtained by performing a stable sort of the elements a(1), ..., a(N) included in the vector a under a sorting criteria that is whether or not the elements are replication sources. The vector Pi is formed of the elements obtained by sorting the elements p(a(1)), ..., p(a(N)) in accordance with the stable sort of these elements a(1), ..., a(N) (Step S2141). The vector $a_1$ is a vector in which only the elements a(1), ..., a(N) are included and the orders of the replication source elements a(f(1)), ..., a(f(M)) are successive. More specifically, the vector $a_1$ is a vector in which only the elements a(1), ..., a(N) are included, the ηth, ..., η+M−1th elements of the vector $a_1$ are the replication source elements a(f(1)), ..., a(f(M)), and other elements are not the replication sources. η is an integer not less than 1 and not more than N+1-M. "the ηth element" indicates the element of which the order is ηth. For example, the vector $a_1$ may be a vector in which the 1st, ..., Mth elements of the vector $a_1$ are the replication source elements a(f(1)), ..., a(f(M)) and other elements are not the replication sources, or may be a vector in which the N−M+1th, ..., Nth elements of the vector $a_1$ are the replication source elements a(f(1)), ..., a(f(M)) and other elements are not the replication sources. This stable sort is performed while the correspondence between the element a(n) of the vector a and the element p(a(n)) of the vector p is maintained. In other words, the correspondence between the element a(n) and the element p(a(n)) is maintained. For example, when the element a(n) becomes the n'th element of the vector $a_1$ (where, n is an integer not less than 1 and not more than N) through this stable sort, the element p(a(n)) corresponding to the element a(n) is the n'th element of the vector $p_1$. This is the order of the element in a plaintext, and the concealed element is not necessarily in this order. For example, when the vector a is as exemplified in the expression (1), p(a(n))=n−1 holds, the 1st, ..., Mth elements of the vector $a_1$ are the replication source elements a(f(1)), ..., a(f(M)), and other elements are not the replication source elements, the relation between the vectors $a_1$ and $p_1$ described above is as below.

$$a_1 = \begin{pmatrix} w \\ x \\ y \\ z \\ * \\ * \\ * \\ * \\ * \\ * \end{pmatrix}, p_1 = \begin{pmatrix} 0 \\ 3 \\ 4 \\ 8 \\ 1 \\ 2 \\ 5 \\ 6 \\ 7 \\ 9 \end{pmatrix} \quad (2)$$

The additive inverse arithmetic unit 2142-$k$ uses the concealed text [$a_1$] of the vector $a_1$ (the seventh set) to obtain, by secure computation, a concealed text [$a_2$] of the vector $a_2$ (the eighth set), and outputs the obtained concealed text [$a_2$], where the vector $a_2$ is an N-dimensional vector which is obtained by setting the elements $a_1(1), a_1(2), \ldots, a_1(N)$ included in the vector $a_1$ to elements $a_2(1)=a_1(1)$, $a_2(2)=a_1(2)-a_1(1), \ldots, a_2(N)=a_1(N)-a_1(N-1)$ (Step S2142). For example, in the case of the vector $a_1$ exemplified in the expression (2), the relation among the vectors $p_1$, $a_1$, and $a_2$ is as below.

$$p_1 = \begin{pmatrix} 0 \\ 3 \\ 4 \\ 8 \\ 1 \\ 2 \\ 5 \\ 6 \\ 7 \\ 9 \end{pmatrix}, a_1 = \begin{pmatrix} w \\ x \\ y \\ z \\ * \\ * \\ * \\ * \\ * \\ * \end{pmatrix}, a_2 = \begin{pmatrix} w \\ x-w \\ y-x \\ z-y \\ * \\ * \\ * \\ * \\ * \\ * \end{pmatrix} \quad (3)$$

The sorting unit 2143-$k$ uses the concealed text [$a_2$] of the vector $a_2$ (the eighth set) and the concealed text [$p_1$] of the vector $p_1$ (the ninth set) to obtain, by secure computation, a concealed text [$a_4$] of the vector $a_4$ which is an N-dimensional vector obtained by sorting the elements of the vector $a_2$, and outputs the obtained concealed text [$a_4$] (Step S2143). The vector $a_4$ is a vector obtained by rearranging the orders of the elements of the vector $a_2$ into the original orders corresponding to the orders of the elements of the vector a. More specifically, the vector $a_4$ is a vector obtained by setting the element a(f(h))–a(f(h–1)) of the vector $a_2$ to the order of the replication source element a(f(h)) of the vector a, setting the element a(f(1)) of the vector $a_2$ to the order of the replication source element a(f(1)) of the vector a, and returning other elements of the vector $a_2$ into the original orders of the vector a corresponding to the other elements.

<<Details of Step S2143>>

Figure 4C:
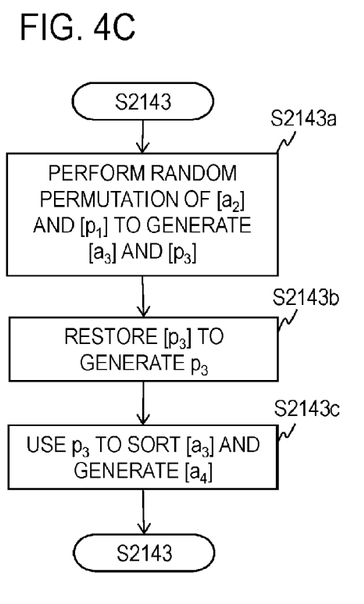
FIG. 4C is a flowchart illustrating processing of Step S2143 in FIG. 4B.

The details of Step S2143 will be described with reference to FIG. 4C.

The random permutation unit 2143a-k of the sorting unit 2143-k uses the concealed text $[a_2]$ of the vector $a_2$ (the eighth set) and the concealed text $[p_1]$ of the vector $p_1$ (the ninth set) to obtain, by secure computation, a concealed text $[a_3]$ of a vector $a_3$ and a concealed text $[p_3]$ of a vector $p_3$ respectively corresponding to an N-dimensional vector $a_3$ (the tenth set) and an N-dimensional vector $p_3$ (the eleventh set), and outputs the obtained concealed text $[a_3]$ and concealed text $[P_3]$, where the N-dimensional vector $a_3$ is obtained through random permutation of the orders of elements $a_2(1), \ldots, a_2(N)$ of the vector $a_2$, and the N-dimensional vector $p_3$ is obtained through random permutation of the orders of elements $p_1(1), \ldots, p_1(N)$ of the vector $p_1$, while maintaining the correspondence relation between an element $a_2(n)$ of the vector $a_2$ and an element $p_1(n)$ of the vector $p_1$ (where, $n \in \{1, \ldots, N\}$) (Step S2143a). The vector $a_3$ is a vector obtained by rearranging the orders of the elements $a_2(1), \ldots, a_2(N)$ of the vector $a_2$ and the vector $p_3$ is a vector obtained by rearranging the orders of the elements $p_1(1), \ldots, p_1(N)$ of the vector $p_1$. In other words, the random permutation unit 2143a-k uses the concealed text $[a_2]$ of the vector $a_2$ (the eighth set) and the concealed text $[p_1]$ of the vector $p_1$ (the ninth set) to obtain the concealed text $[a_3]$ of the vector $a_3$ and the concealed text $[p_3]$ of the vector $p_3$ by secure computation, and outputs the obtained concealed text $[a_3]$ and concealed text $[p_3]$. The vector $a_3$ is a vector obtained through random permutation of the orders of the elements $a_2(1), \ldots, a_2(N)$ of the vector $a_2$ and the vector $p_3$ is a vector obtained through random permutation of the orders of the elements $p_1(1), \ldots, p_1(N)$ of the vector $p_1$. In this processing, the correspondence relation between the element $a_2(n)$ and the element $p_1(n)$ is maintained. For example, when the element $a_2(n)$ becomes the n'th element of the vector $a_3$ through this random permutation, the element $p_1(n)$ is the n'th element of the vector $p_3$. This is the order of the element in a plaintext, and the concealed element is not necessarily in this order. In the case of the vectors $p_1$ and $a_2$ exemplified in the expression (3), the relation between the vectors $p_3$ and $a_3$ is as below, for example.

$$p_3 = \begin{pmatrix} 4 \\ 0 \\ 2 \\ 1 \\ 6 \\ 3 \\ 7 \\ 5 \\ 9 \\ 3 \end{pmatrix}, a_3 = \begin{pmatrix} y-x \\ w \\ * \\ * \\ * \\ x-w \\ * \\ * \\ * \\ z-y \end{pmatrix} \quad (4)$$

The restoring unit 2143-b-k restores the vector $p_3$ from the concealed text $[p_3]$ of the vector $p_3$ and outputs the restored vector $p_3$ (Step S2143b).

The order restoring unit 2143c-k uses the concealed text $[a_3]$ of the vector $a_3$ to obtain, by secure computation, a concealed text $[a_4]$ of the vector $a_4$ which is an N-dimensional vector obtained by sorting the elements of the vector $a_3$ in accordance with the vector $p_3$, and outputs the obtained concealed text $[a_4]$ (Step S2143c). The vector $a_4$ is a vector obtained by rearranging the orders of the elements of the vector $a_3$ into the original orders corresponding to the orders of the elements of the vector a. These orders can be determined by the elements of the vector $p_3$ (refer to the expression (4)). More specifically, the vector $a_4$ is the N-dimensional vector obtained by rearranging the elements of the vector $a_3$ through the sort that rearranges the order of the elements of the vector $p_3$ into the orders of the elements of the vector p. In the case of the vectors $p_3$ and $a_3$ exemplified in the expression (4), the vector $a_4$ is as below, for example (this ends the description of <<Details of Step S2143>>).

$$a_4 = \begin{pmatrix} w \\ * \\ * \\ x-w \\ y-x \\ * \\ * \\ * \\ z-y \\ * \end{pmatrix} \quad (5)$$

The multiplication arithmetic unit 2144-k uses the concealed text $[a_4]$ of the vector $a_4$ and the concealed text $[c]$ of the vector c to obtain, by secure computation, the concealed text $[a_5]$ of the vector $a_5$ (the second set), and outputs the obtained concealed text $[a_5]$, where an element $a_5(n)$ of the vector $a_5$ is a result of multiplication of an element $a_4(n)$ of the vector $a_4$ and the element $c(n)$ of the vector c (for example, a multiplication result or remainder of a multiplication result) (where, $n \in \{1, \ldots, N\}$) (Step S2144). The element $a_4(n)$ is the nth element of the vector $a_4$, the element $c(n)$ is the nth element of the vector c, and the element $a_5(n)$ is the nth element of the vector $a_5$. This processing is processing for obtaining the concealed text $[a_5]$ of the vector $a_5$ in which elements that are not the replication sources of the vector $a_4$ are set to zero. For example, in the case of the vector c corresponding to the vector a exemplified in the expression (1) and the vector $a_4$ exemplified in the expression (5), the relation among the vectors $a_4$, c, and $a_5$ is as below (this ends the description of <<Details of Step S214>>).

$$a_4 = \begin{pmatrix} w \\ * \\ * \\ x-w \\ y-x \\ * \\ * \\ * \\ z-y \\ * \end{pmatrix}, c = \begin{pmatrix} 1 \\ 0 \\ 0 \\ 1 \\ 1 \\ 0 \\ 0 \\ 0 \\ 1 \\ 0 \end{pmatrix}, a_5 = \begin{pmatrix} w \\ 0 \\ 0 \\ x-w \\ y-x \\ 0 \\ 0 \\ 0 \\ z-y \\ 0 \end{pmatrix} \quad (6)$$

The concealed text $[a_5]$ of the vector $a_5$ is input to the cumulative addition arithmetic unit 115-k, the processing described in the first embodiment is performed, and the concealed text [b] of the vector b is obtained. For example, in the case of the vector $a_5$ in the expression (6), the relation between the vectors $a_5$ and b is as below.

$$a_5 = \begin{pmatrix} w \\ 0 \\ 0 \\ 0 \\ x-w \\ y-x \\ 0 \\ 0 \\ 0 \\ z-y \\ 0 \end{pmatrix}, b = \begin{pmatrix} w \\ w \\ w \\ w \\ x \\ y \\ y \\ y \\ y \\ z \\ z \end{pmatrix}$$

First Modification of the Second Embodiment

In the second embodiment, the sorting unit $2143$-$k$ performs the sort including random permutation by secure computation. Instead of this, the present modification performs a sort that does not include random permutation, by secure computation. Other matters are the same as those described in the second embodiment.

The input information arithmetic unit $214$-$k$ of an element replication device $21'$-$k$ of a secure computation system $2'$ according to the present modification includes a sorting unit $2143'$-$k$ instead of the sorting unit $2143$-$k$ in the second embodiment (FIG. 3A). The sorting unit $2143'$-$k$ uses the concealed text $[a_2]$ of the vector $a_2$ (the eighth set) and the concealed text $[p_1]$ of the vector $p_1$ (the ninth set) to obtain, by secure computation, the concealed text $[a_4]$ of the vector $a_4$ which is an N-dimensional vector obtained by sorting the elements of the vector $a_2$, and outputs the obtained concealed text $[a_4]$ (Step S2143'). Unlike in Step S2143, the sorting unit $2143'$-$k$ does not perform the above-described Steps S2143$a$ and S2143$b$, but uses the concealed text $[p_1]$ of the vector $p_1$ to obtain the concealed text $[a_4]$ of the vector $a_4$ and outputs the obtained concealed text $[a_4]$. The sorting unit $2143'$-$k$ may use the vector $p_1$ restored from the concealed text $[p_1]$ of the vector $p_1$ to obtain the concealed text $[a_4]$ of the vector $a_4$ by secure computation, or may obtain the concealed text $[a_4]$ of the vector $a_4$ by secure computation without restoring the concealed text $[p_1]$ of the vector $p_1$.

Second Modification of the Second Embodiment

In the second embodiment and the first modification of the second embodiment, secure computation is applied to a concealed text of a vector serving as a processing object. However, with respect to a vector that may be disclosed, a plaintext vector may be a processing object instead of a concealed text of a vector, and calculation may be performed with respect to the plaintext vector, instead of secure computation. For example, the order information generating unit $212$-$k$ may output the vector p, and the stable sorting unit $2141$-$k$ may perform a stable sort of the vectors a and p to obtain the vectors $a_1$ and $p_1$ and output the obtained vectors $a_1$ and $p_1$. The additive inverse arithmetic unit $2142$-$k$ may obtain the vector $a_2$ from the vector $a_1$ and output the obtained vector $a_2$, and the sorting unit $2143$-$k$ or the sorting unit $2143'$-$k$ may use the vectors $a_2$ and $p_1$ to obtain the vector $a_4$ and output the obtained vector $a_4$. The multiplication arithmetic unit $2144$-$k$ may use the vectors $a_4$ and c to obtain the vector $a_5$ and output the obtained vector $a_5$.

[Characteristics]

As described above, a replication source element is replaced by an addition result (for example, a subtraction result) that is obtained by adding an additive inverse of that replication source element to a replication source element immediately before that replication source element, whereby the replication processing can be implemented by an addition (for example, summation) which can perform many pieces of processing with a very light calculation. This can reduce the calculation cost compared with a conventional case. It should be noted that, in order to obtain the vector $a_5$ or the concealed text $[a_5]$ from the vector $a_4$ or the concealed text $[a_4]$, one phase of multiplication such as multiplication is necessary. However, the number of phases does not depend on N. Especially when preprocessing can be performed for a replication source element as in the first embodiment, only O(N) times of addition is required for the calculation for replication at the time of element replication.

MODIFICATION AND OTHER

It should be noted that the present invention is not limited to the embodiments described above. For example, various types of processing described above can be performed in time series in accordance with the descriptions as well as performed in parallel or individually in accordance with the capacity or the need of the device performing the processing. Needless to say, modifications also can be added as appropriate within the scope of the present invention.

When the configuration described above is implemented on a computer, the contents of processing function to be contained in each device is written by a program. With this program executed on the computer, the above-described processing function is executed on the computer. This program with the contents of processing written thereinto can be stored in a computer-readable recording medium. An example of the computer readable recording medium is a non-transitory recording medium. Examples of such a recording medium include a magnetic recording device, an optical disk, a magneto-optical recording medium, and a semiconductor memory.

Distribution of this program is implemented by sales, transfer, rental, and other transactions of a portable recording medium such as a DVD and CD-ROM with the program recorded thereon, for example. Furthermore, this program may be stored in a storage unit of a server computer and transferred from the server computer to other computers via a network so as to be distributed.

A computer that executes a program as described above first stores the program stored in a portable recording medium or transferred from a server computer in a storage unit of the computer, for example. When the processing is performed, the computer reads out the program stored in the recording medium of the computer and performs processing in accordance with the program thus read out. As another execution form of this program, the computer may directly read out the program from a portable recording medium and perform processing in accordance with the program. Furthermore, each time the program is transferred to the computer from the server computer, the computer may sequentially perform processing in accordance with the received program. Alternatively, what is called application service provider (ASP) type of services may be used to perform the processing described above, with which the program is not transferred from the server computer to the computer and the processing function is realized only with execution instructions and result acquisition.

In the present embodiments, the processing function of the present device is implemented with a predetermined program executed on a computer. However, at least part of the processing function may be implemented in a hardware manner.

INDUSTRIAL APPLICABILITY

The present invention can be used in the field of spreadsheet operation, for example, and especially, can be used in the field of software (encryption technology) for performing calculation that replicates an element as a part of a concealed spreadsheet in a concealed state, for example. The present invention can be used in element replication processing (such as spreadsheet processing) of a set used in the encryption technology, for example.

DESCRIPTION OF REFERENCE NUMERALS

Secure computation system 1, 1', 2, 2'
Element replication device 11-$k$, 11'-$k$, 21-$k$, 21'-$k$

What is claimed is:

1. An element replication device for replicating a plurality of replication source elements by cumulative addition, the element replication device comprising:
    a first arithmetic unit that obtains a second set or a concealed text of the second set by using at least part of a first set or a concealed text of at least part of the first set; and
    a second arithmetic unit that obtains a third set or a concealed text of the third set by using the second set or the concealed text of the second set, the third set including the replicated replication source elements, wherein
    the first set includes N ordered elements $a(1), \ldots, a(N)$ where N is an integer equal to or larger than 2, and the first set includes the plurality of M replication source elements $a(f(1)), \ldots, a(f(M))$ where $\{a(f(1)), \ldots, a(f(M))\} \subseteq \{a(1), \ldots, a(N)\}$ and $2 \leq M \leq N$,
    an additive inverse of a replication source element $a(f(h-1))$ is $-a(f(h-1))$, where an order of the replication source element $a(f(h-1))$ is before a replication source element $a(f(h))$ and the replication source element $a(f(h-1))$ is the closest replication source element to the replication source element $a(f(h))$,
    the second set includes N elements $a_5(1), \ldots, a_5(N)$, and the second set is obtained by setting the replication source elements $a(f(h))$ included in the first set to $a(f(h))-a(f(h-1))$ and setting elements other than the replication source elements $a(f(h))$ in the first set to zero,
    a first element in the second set is $a_5(1)$, and $i=2, \ldots$, Nth elements in the second set are $a_5(i)$, and
    the third set includes a first element $b(1)=a_5(1)$ and $i=2, \ldots$, Nth elements $b(i)=b(i-1)+a_5(i)$.

2. The element replication device according to claim 1, wherein
    a fourth set being a set including the element $a(f(h))-a(f(h-1))$, or a concealed text of the fourth set is obtained in advance from a fifth set being a set including the replication source elements $a(f(1)), \ldots, a(f(M))$; or a concealed text of the fifth set, and the first arithmetic unit uses the fourth set or the concealed text of the fourth set to obtain the second set or the concealed text of the second set, or
    the first arithmetic unit uses the first set or the concealed text of the first set to obtain the second set or the concealed text of the second set.

3. The element replication device according to claim 1 or 2, wherein
    a fourth set being a set obtained by setting the replication source element $a(f(h))$ included in a sixth set to $a(f(h))-a(f(h-1))$, or a concealed text of the fourth set is obtained in advance, the sixth set including the replication source elements $a(f(1)), \ldots, a(f(M))$ ordered in accordance with the orders of the elements $a(1), \ldots, a(N)$, and
    the first arithmetic unit uses the fourth set or the concealed text of the fourth set to obtain the second set or the concealed text of the second set.

4. The element replication device according to claim 1 or 2, wherein the first arithmetic unit
    uses the first set or the concealed text of the first set to obtain a seventh set or a concealed text of the seventh set, the seventh set obtained by performing a stable sort of the elements $a(1), \ldots, a(N)$ included in the first set under a sorting criteria that is whether or not the element is a replication source, and the seventh set including the elements $a(1), \ldots, a(N)$ with the orders of the elements $a(f(1)), \ldots, a(f(M))$ being successive,
    uses the seventh set or the concealed text of the seventh set to obtain an eighth set or a concealed text of the eighth set, the eighth set being a set obtained by setting elements $a_1(1), a_1(2), \ldots, a_1(N)$ included in the seventh set to elements $a_2(1)=a_1(1)$, $a_2(2)-a_1(2)-a_1(1), \ldots, a_2(N)=a_1(N)-a_1(N-1)$ with respect to $h=2, \ldots, M$, and
    uses the eighth set or the concealed text of the eighth set to obtain the second set or the concealed text of the second set, the second set being a set obtained by sorting the elements in the eighth set and setting the elements other than the replication source to zero.

5. The element replication device according to claim 4, wherein the first arithmetic unit
    uses the concealed text of the first set to obtain the concealed text of the seventh set by secure computation,
    obtains a concealed text of a ninth set, the ninth set including elements obtained by sorting elements $p(a(1)), \ldots, p(a(N))$ representing the orders of the elements $a(1), \ldots, a(N)$ in accordance with the stable sort of the elements $a(1), \ldots, a(N)$,
    uses the concealed text of the seventh set to obtain the concealed text of the eighth set by secure computation,
    uses the concealed text of the eighth set and the concealed text of the ninth set to obtain, by secure computation, a concealed text of a tenth set and a concealed text of an eleventh set respectively, the concealed text of the tenth set corresponding to the tenth set obtained by random permutation of the orders of the elements in the eighth set, the concealed text of the eleventh set corresponding to the eleventh set obtained by random permutation of the orders of the elements in the ninth set, while maintaining the correspondence relation between the elements in the eighth set and the elements in the ninth set, the orders of elements in the eighth set rearranged in the tenth set, and the orders of elements in the ninth set rearranged in the eleventh set, and
    uses a restoring result of the concealed text of the eleventh set and the concealed text of the tenth set to obtain the concealed text of the second set being a set obtained by sorting the elements in the tenth set and setting the elements other than the replication sources to zero.

6. The element replication device according to claim 1, wherein the first arithmetic unit obtains the concealed text of the second set by secure computation, and the second arithmetic unit uses the concealed text of the second set to obtain the concealed text of the third set by secure computation.

7. An element replication method for replicating a plurality of replication source elements by cumulative addition, the method comprising:

a first step of obtaining a second set or a concealed text of the second set in a first arithmetic unit by using at least part of a first set or a concealed text of at least part of the first set; and a second step of obtaining a third set or a concealed text of the third set by using the second set or the concealed text of the second set in a second arithmetic unit, the third set including the replicated replication source elements, wherein the first set includes N ordered elements $a(1), \ldots, a(N)$ where N is an integer equal to or larger than 2, and the first set includes the plurality of replication source elements $a(f(1)), \ldots, a(f(M))$ where $\{a(f(1)), \ldots, a(f(M))\} \subseteq \{a(1), \ldots, a(N)\}$ and $2 \leq M \leq N$, an additive inverse of a replication source element $a(f(h-1))$ is $-a(f(h-1))$, where an order of the replication source element $a(f(h-1))$ is before a replication source element $a(f(h))$ and the replication source element $a(f(h-1))$ is the closest replication source element to the replication source element $a(f(h))$, the second set includes N elements $a_5(1), \ldots, a_5(N)$, and the second set is obtained by setting the replication source elements $a(f(h))$ included in the first set to $a(f(h))-a(f(h-1))$ and setting elements other than the replication source elements $a(f(h))$ in the first set to zero, a first element in the second set is $a_5(1)$, and $i=2, \ldots, Nth$ in the second set are $a_5(i)$, and the third set includes a first element $b(1)=a_5(1)$ and $i=2, \ldots, Nth$ elements $b(i)=b(i-1)+a_5(i)$.

8. A non-transitory computer-readable recording medium storing a program for causing a computer to function as an element replication device that replicates a plurality of replication source elements by cumulative addition, the element replication device comprising:

a first arithmetic unit that obtains a second set or a concealed text of the second set by using at least part of a first set or a concealed text of at least part of the first set; and a second arithmetic unit that obtains a third set or a concealed text of the third set by using the second set or the concealed text of the second set, the third set including the replicated replication source elements, wherein the first set includes N ordered elements $a(1), \ldots, a(N)$ where N is an integer equal to or larger than 2, and the first set includes the plurality of replication source elements $a(f(1)), \ldots, a(f(M))$ where $\{a(f(1)), \ldots, a(f(M))\} \subseteq \{a(1), \ldots, a(N)\}$ and $2 \leq M \leq N$, an additive inverse of a replication source element $a(f(h-1))$ is $-a(f(h-1))$, where an order of the replication source element $a(f(h-1))$ is before a replication source element $a(f(h))$ and the replication source element $a(f(h-1))$ is the closest replication source element to the replication source element $a(f(h))$, the second set includes N elements $a_5(1), \ldots, a_5(N)$, and the second set is obtained by setting the replication source elements $a(f(h))$ included in the first set to $a(f(h))-a(f(h-1))$ and setting elements other than the replication source elements $a(f(h))$ in the first set to zero, a first element in the second set is $a_5(1)$, and $i=2, \ldots, Nth$ elements in the second set are $a_5(i)$, and the third set includes a first element $b(1)=a_5(1)$ and $i=2, \ldots, Nth$ elements $b(i)=b(i-1)+a_5(i)$.

* * * * *

UNITED STATES PATENT AND TRADEMARK OFFICE
CERTIFICATE OF CORRECTION

PATENT NO.        : 10,050,775 B2
APPLICATION NO.   : 15/109584
DATED             : August 14, 2018
INVENTOR(S)       : Koki Hamada et al.

It is certified that error appears in the above-identified patent and that said Letters Patent is hereby corrected as shown below:

In the Claims

Column 18, Lines 33-34 please change the equation from "$a_2(1)=a_1(1), a_2(2)-a_1(2)-a_1(1), ..., a_2(N)=a_1(N)-a_1(N-1)$" to --$a_2(1)=a_1(1), a_2(2)=a_1(2)-a_1(1), ..., a_2(N)=a_1(N)-a_1(N-1)$--.

Signed and Sealed this
Fourteenth Day of May, 2019

Andrei Iancu
*Director of the United States Patent and Trademark Office*